(12) United States Patent
Walz et al.

(10) Patent No.: US 10,767,666 B1
(45) Date of Patent: Sep. 8, 2020

(54) METHOD AND SYSTEM FOR CONTROLLING A PNEUMATIC VALVE

(71) Applicant: PRATT & WHITNEY CANADA CORP., Longueuil (CA)

(72) Inventors: Andrew Walz, Toronto (CA); Mehmet Tanju, Kanata (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 0 days.

(21) Appl. No.: 16/366,163

(22) Filed: Mar. 27, 2019

(51) Int. Cl.
| F15B 11/032 | (2006.01) |
| F01D 17/20 | (2006.01) |
| F02D 41/20 | (2006.01) |
| F02M 67/12 | (2006.01) |

(52) U.S. Cl.
CPC .......... F15B 11/032 (2013.01); F01D 17/205 (2013.01); F02D 41/20 (2013.01); F02M 67/12 (2013.01); *F02D 2041/2027* (2013.01); *F02D 2041/2051* (2013.01); *F15B 2211/8855* (2013.01)

(58) Field of Classification Search
CPC .......... F15B 11/032; F15B 2211/8855; F02M 67/12; F01D 17/205; F02D 41/20; F02D 2041/2027; F02D 2041/2051
See application file for complete search history.

(56) References Cited

U.S. PATENT DOCUMENTS

2018/0230852 A1* 8/2018 Greenberg .............. F01D 17/24

OTHER PUBLICATIONS

Linear Technology Programmable Quad Supply LTC2900, LT/TP 0403 2K • Printed in USA, Linear Technology Corporation 2002.

* cited by examiner

*Primary Examiner* — Xiao En Mo
(74) *Attorney, Agent, or Firm* — Norton Rose Fulbright Canada LLP (57) ABSTRACT

Methods and systems for controlling a pneumatic starter air valve of a gas turbine engine are described herein. The starter air valve is controlled in a first mode of operation by actuating a first solenoid of the starter air valve with a steady-state input signal. Passage of the steady-state input signal to a second solenoid of the starter air valve is allowed, to actuate the second solenoid and enable pressure regulation of the starter air valve. The starter air valve is controlled in a second mode of operation by actuating the first solenoid with a pulse-width modulation input signal. Passage of the pulse-width modulation input signal to the second solenoid is prevented, to disable the pressure regulation in the second mode of operation.

13 Claims, 6 Drawing Sheets

METHOD AND SYSTEM FOR CONTROLLING A PNEUMATIC VALVE

TECHNICAL FIELD

The present disclosure relates generally to pneumatic valves, and more particularly to control of pneumatic starter air valves of gas turbine engines.

BACKGROUND OF THE ART

Gas turbine aircraft engines may be configured for air/pneumatic starts with the use of an air flow provided from an air source, such as from an auxiliary power unit, an external air compressor or cross-bleed air from an already running engine. An engine's compressor spools are rotated by the air flow acting directly on the compressor blades to start the engine or the air flow drives a separate motor that starts the engine.

A pneumatic starter air valve can control the air flow supplied to the compressor spools or the separate motor for starting the engine. A solenoid of the pneumatic starter air valve can be actuated with a direct current voltage signal to provide the air flow for turning the engine. However, it is harder to control the pneumatic starter air valve response when the solenoid is actuated with a non-direct current voltage signal.

As such, there is a need for improvement.

SUMMARY

In one aspect, there is provided a method for controlling a pneumatic starter air valve of a gas turbine engine. The method comprises controlling the starter air valve in a first mode of operation by actuating a first solenoid of the starter air valve with a steady-state input signal, allowing passage of the steady-state input signal to a second solenoid of the starter air valve to actuate the second solenoid and enable pressure regulation of the starter air valve, controlling the starter air valve in a second mode of operation by actuating the first solenoid with a pulse-width modulation input signal, and preventing passage of the pulse-width modulation input signal to the second solenoid to disable the pressure regulation in the second mode of operation.

In another aspect, there is provided a system for controlling a pneumatic starter air valve of a gas turbine engine. The system comprising a first solenoid configured to operate the starter air valve in a first mode when the first solenoid is actuated by a steady-state input signal and to operate the starter air valve in a second mode when the first solenoid is actuated by a pulse-width modulation input signal, a second solenoid configured to enable pressure regulation by a pressure regulator of the starter air valve when the second solenoid is actuated by the steady-state voltage input signal, and an electronic circuit between the first solenoid and the second solenoid, the electronic circuit configured to allow passage of the steady-state input signal to the second solenoid and to prevent passage of the pulse-width modulation input signal to the second solenoid, the pressure regulation being disabled when the second solenoid is prevented from being actuated.

BRIEF DESCRIPTION OF THE DRAWINGS

Reference is now made to the accompanying figures in which.

It will be noted that throughout the appended drawings, like features are identified by like reference numerals.

DETAILED DESCRIPTION

Figure 1:
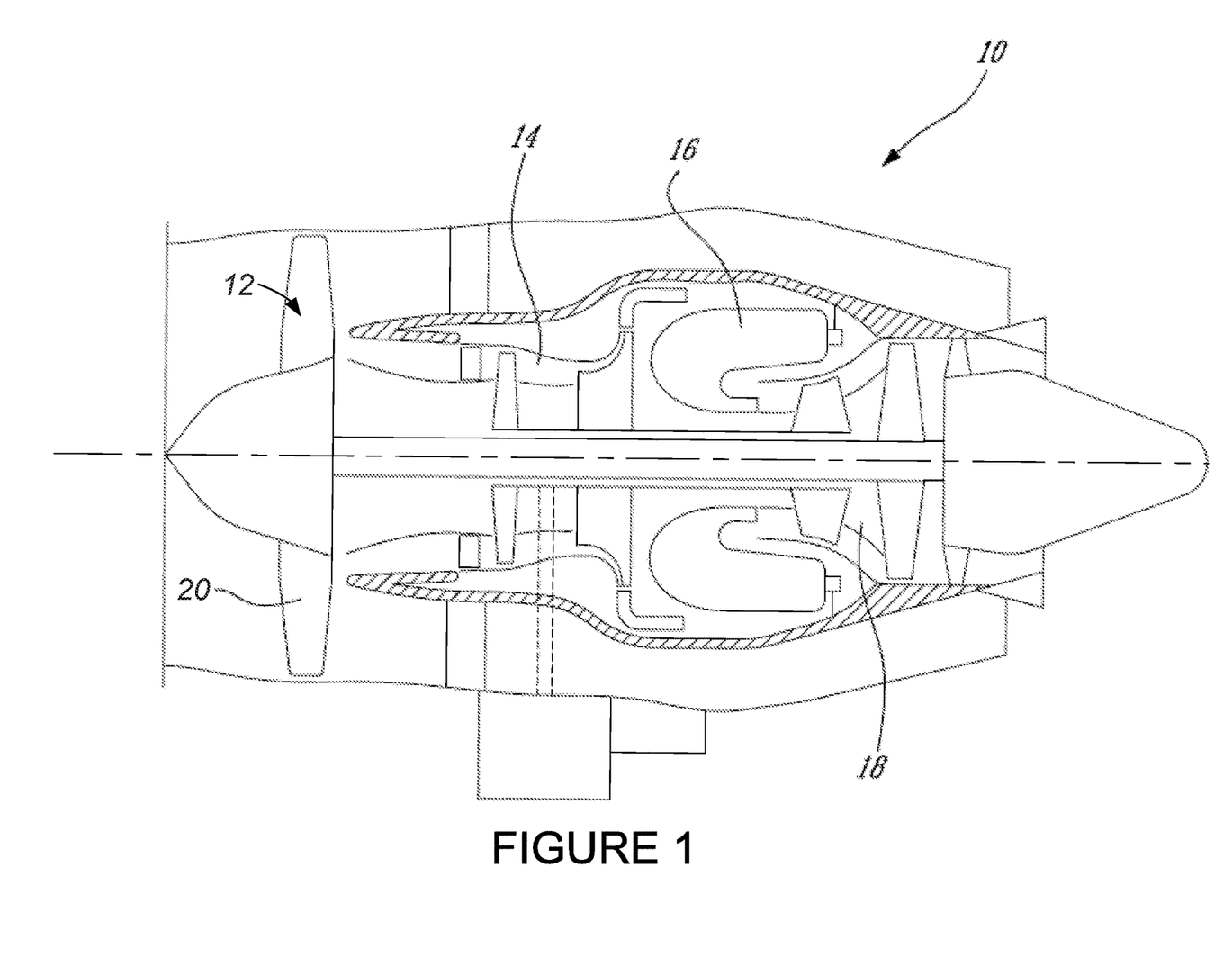
FIG. 1 is a schematic of an example gas turbine engine, in accordance with some embodiments.

FIG. 1 illustrates a gas turbine engine 10 that may be started using the methods and systems described herein. Engine 10 generally comprises in serial flow communication: a fan rotor 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The fan rotor 12 comprises a plurality of fan blades 20. It should be understood that while the engine 10 is a turbofan engine, the methods and systems described herein may be applicable to any other type of gas turbine engine, such as a turboprop, turboshaft or any other suitable industrial engine that may be air started.

Figure 2A:
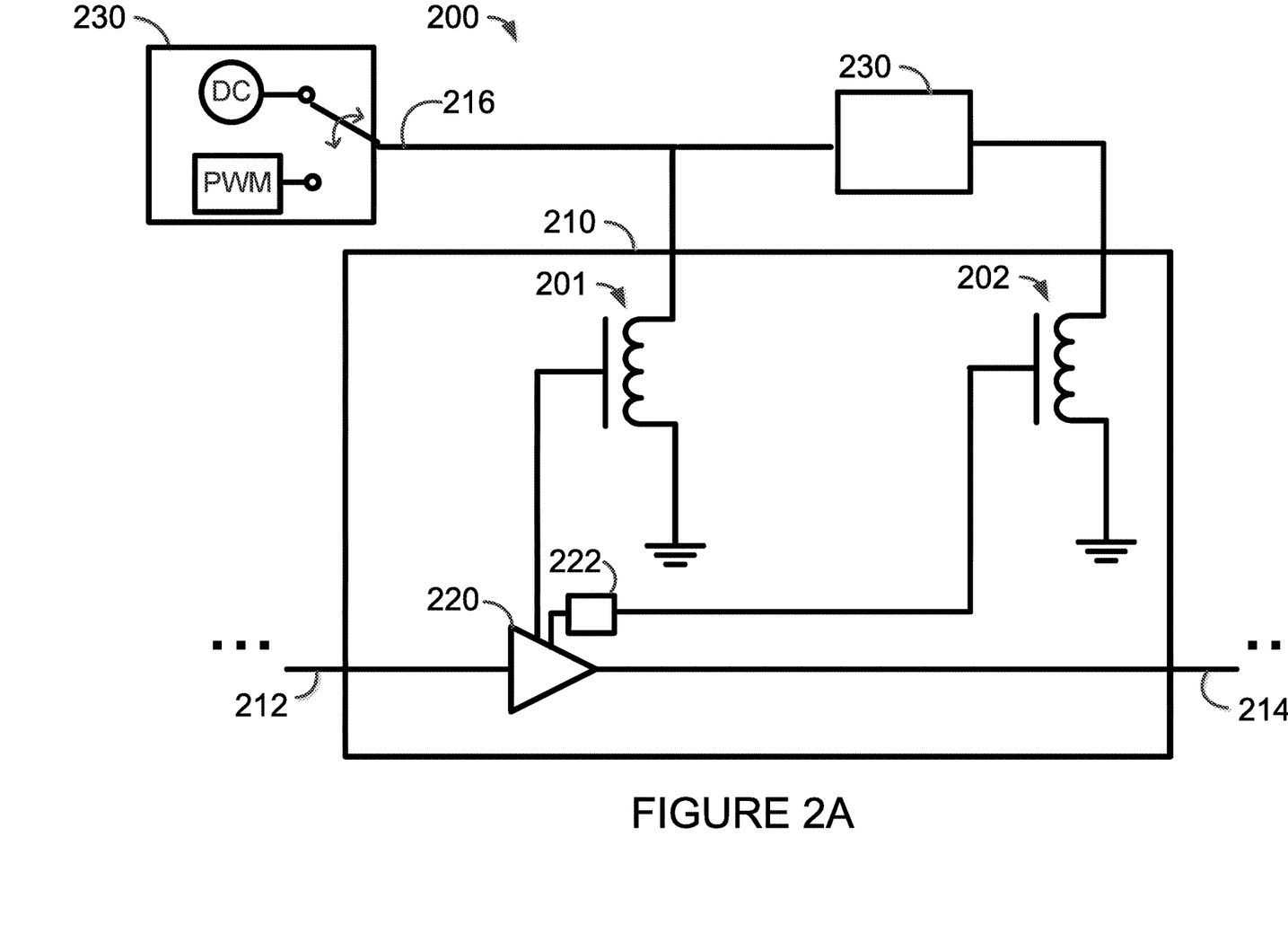
FIG. 2A is a schematic diagram illustrating a system for controlling a pneumatic valve, in accordance with some embodiments.

With reference to FIG. 2A, there is illustrated a system 200 for controlling a pneumatic starter air valve 210 used in air starting an engine, such as engine 10, in accordance with an embodiment. In the illustrated embodiment, a controllable power supply 230 is configured to output a steady-state voltage signal (i.e., a direct current (DC) voltage signal) or a pulse-width modulation (PWM) voltage signal, which is provided to an input 216 of the system 200. The steady-state voltage signal provided to the input 216 is referred to herein as the "steady-state input signal" and the PWM voltage signal provided to the input 216 is referred to herein as the "PWM input signal". The controllable power supply 230 can be controlled, for example, by an engine controller or an aircraft computer, to provide the steady-state input signal or the PWM input signal.

A first solenoid 201 of the pneumatic valve 210 is configured to operate the pneumatic valve 210 in a first mode of operation when the first solenoid 201 is actuated by the steady-state input signal. The first solenoid 201 is configured to operate the pneumatic valve 210 in a second mode of operation when the first solenoid 201 is actuated by the PWM input signal.

A second solenoid 202 of the pneumatic valve 210 is configured to enable pressure regulation by a mechanical pressure regulator 222 of the pneumatic valve 210 when the second solenoid 202 is actuated by the steady-state input signal. When the second solenoid 202 is not actuated, pressure regulation by the pressure regulator 222 is disabled. While the second solenoid 202 is illustrated as part of the pneumatic valve 210, it should be understood that this is for illustrative purposes only and that the second solenoid 202 may, in some embodiments, be separate from the pneumatic valve 210.

An electronic circuit 230 is positioned between the first solenoid 201 and the second solenoid 202. The electronic circuit 230 is configured to prevent the second solenoid 202 from being actuated by the PWM input signal, when the pneumatic valve 210 is operating in the second mode. The electronic circuit 230 is configured to allow passage of the steady-state input signal to the second solenoid 202, when the pneumatic valve 210 is operating in the first mode. While the electronic circuit 230 is illustrated as separate from the pneumatic valve 210, it should be understood that this is for illustrative purposes only and that the electronic circuit 230 may, in some embodiments, be integrated with the pneumatic valve 210.

The first mode of operation is used for starting the engine 10, in accordance with some embodiments. In the first mode of operation, both the first solenoid 201 and the second solenoid 202 are actuated with the steady-state input signal. When the first solenoid 201 is actuated with the steady-state input signal, the first solenoid 201 is configured to cause a valve mechanism 220 to open. When the second solenoid 202 is actuated with the steady-state input signal, the second solenoid 202 is configured to enable the pressure regulator 222 to regulate air pressure downstream of the valve mechanism 220. That is, an air flow is provided to an inlet 212 of the pneumatic valve 210 via a connected air source, such as from an auxiliary power unit, an external air compressor or cross-bleed air from an already running engine. When the valve mechanism 220 is open and the air flow is regulated by the pressure regulator 222, the regulated air flow is provided via an outlet 214 of the pneumatic valve 210 for starting the engine 10. When the pressure regulator 222 is enabled, the pressure regulator is configured to regulate pressure at a mechanical regulating point suitable for starting the engine 10.

The second mode of operation is used for low speed motoring functions of the engine 10, in accordance with some embodiments. By actuating the first solenoid 201 with the PWM input signal this may cause the engine 10 to rotate a specific speed depending on a rate and a duty cycle of the PWM input signal. For example, after the engine 10 has been running and is turned-off, the upper portion of the engine 10 may cool more slowly than the bottom portion of the engine 10, which may result in the bending of components of the engine 10. The bending of the engine's rotor may be referred to as "rotor bow". It is not desirable to start the engine 10 when there is "rotor bow", as this can lead to damage to the engine 10. Accordingly, it may be desirable to operate in the second mode of operation to mitigate rotor bow. In some embodiments, the PWM input signal has a rate and a duty cycle to cause the pneumatic valve 210 to provide pressure lower than the regulating point of the pneumatic valve 210. This is because the PWM input signal would cause the valve mechanism 220 to pulse open and close and the pressure regulation by the pressure regulator 222 would be disabled. Accordingly, the second mode of operation may be used to mitigate bowing of the rotor by causing the pneumatic valve 210 to provide pressure lower than the regulating point which would normally be used for starting the engine 10. In some embodiments, when the second solenoid 202 is not actuated (i.e., when pressure regulation by the pressure regulator 222 is disabled), the pressure regulator 220 vents a reference pressure of the pneumatic valve 210 to ambient pressure.

It should be appreciated that when the second solenoid 202 is not actuated and the pressure regulation by the pressure regulator 222 is disabled, that this may improve control of the pneumatic valve response while the first solenoid 201 is actuated by the PWM input signal. It should further be appreciated that by using the electronic circuit 230 positioned between the first and second solenoids 201, 202, that disabling of the pressure regulation by the pressure regulator 222 may be done without any additional control signals.

Figure 2B:
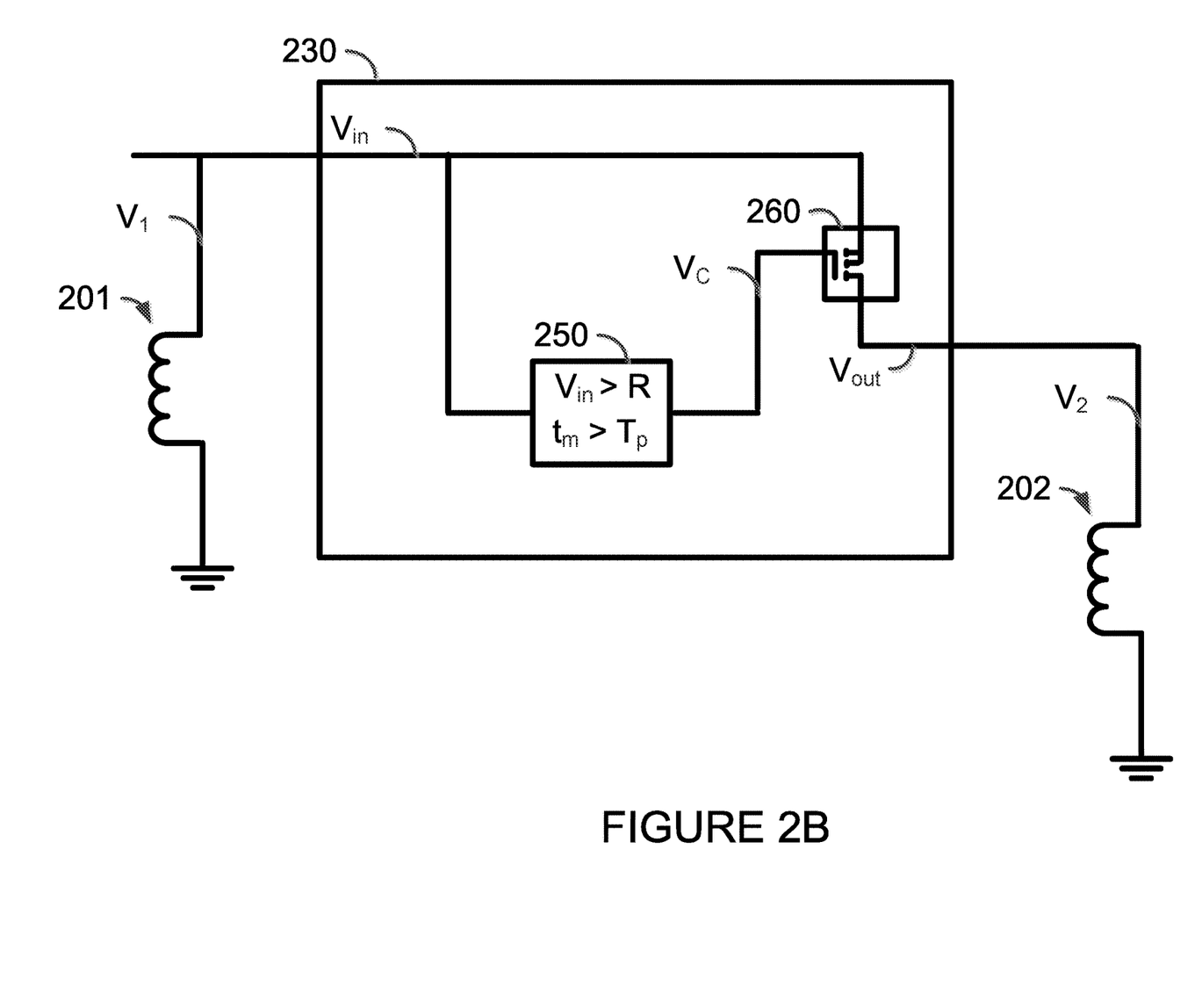
FIG. 2B is a schematic diagram illustrating an electronic circuit, in accordance with some embodiments.

With reference to FIG. 2B, there is illustrated the electronic circuit 230, in accordance with some embodiments. In the illustrated embodiment, the electronic circuit 230 comprises a power supply monitor circuit 250 and a control component 260. The electronic circuit 230 may comprise other electrical and/or electronic components (e.g., resistors, capacitors, diodes, transistors, etc.) to configure the arrangement of the power supply monitor circuit 250 and the control component 260, as would be understood by the person skilled in the art. The power supply monitor circuit 250 is configured to enable the control component 260 to allow passage of the input voltage signal $V_{in}$ provided to the electronic circuit 230, when a voltage level of the input voltage signal $V_{in}$ exceeds a threshold R for a period of time $T_p$. The power supply monitor circuit 250 is configured to disable the control component 260 to prevent passage of the input voltage signal $V_{in}$, when the voltage level of the input voltage signal $V_{in}$ does not exceed the threshold R for the period of time $T_p$.

In accordance with some embodiments, the power supply monitor circuit 250 is configured to monitor the input voltage signal $V_{in}$ and to compare the voltage level of the input voltage signal $V_{in}$ to the threshold R. When the voltage level of the input voltage signal $V_{in}$ exceeds the threshold R, a timer is started. When the time $t_m$ of the timer exceeds a set time period $T_p$, the power supply monitor circuit 250 outputs a control signal $V_C$ having a positive voltage. When the voltage level of the input voltage signal $V_{in}$ drops below the threshold, the timer is reset and the power supply monitor circuit 250 outputs a zero voltage signal for the control signal $V_C$. The power supply monitor circuit 250 may be implemented using any suitable power supply monitor circuit. In specific and non-limiting examples of implementation, the power supply monitor circuit 250 is the LTC9200 programmable quad supply monitor with adjustable reset timer provided by Linear Technology™.

The control component 260 controls the passage of the input voltage signal $V_{in}$ to the output of the electronic circuit 230, as output voltage $V_{out}$. When the control component 260 receives the positive voltage control signal $V_c$, the control component 260 allows for the input voltage signal $V_{in}$ to be output from the electronic circuit 230, as output voltage $V_{out}$. When the control component 260 receives the zero voltage control signal $V_c$, the control component 260 prevents the input voltage signal $V_{in}$ from being output from the electronic circuit 230, as output voltage $V_{out}$. In some embodiments, the control component 260 is a transistor, which when the positive voltage control signal $V_c$ is applied at the transistor's gate (or base), the input voltage signal $V_{in}$ at the source (or collector) is provided to the drain (or emitter), as output voltage $V_{out}$. In some embodiments, the control component 260 may be a relay (or a switch), which when the positive voltage control signal $V_c$ is received by the relay, the relay is closed and the input voltage signal $V_{in}$ passes through the relay, as output voltage $V_{out}$.

Figure 2C:
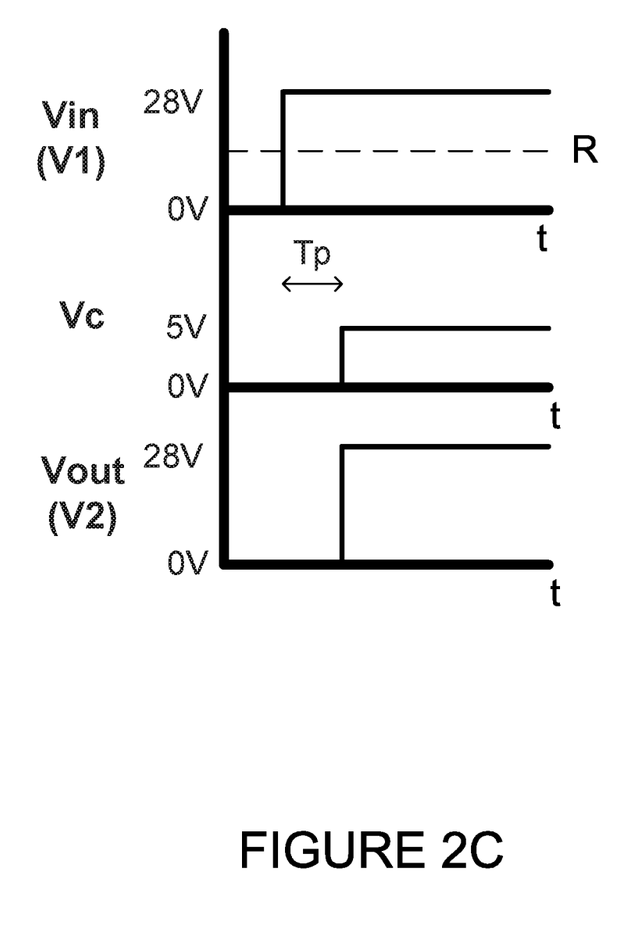
FIG. 2C is a signal diagram illustrating voltage signals in a first mode of operation, in accordance with some embodiments.

With additional reference to FIG. 2C, a signal diagram illustrates the input voltage signal $V_{in}$, the output voltage $V_{out}$, and the voltage control signal $V_c$ for when the pneumatic valve 210 is operated in the first mode of operation, in accordance with some embodiments. The input voltage signal $V_{in}$ is a steady-state input signal, which is also provided to the first solenoid 201 (shown in FIG. 2B as $V_1$). Once the input voltage signal $V_{in}$ exceeds the threshold R for the time period $T_p$, the control signal $V_c$ is a positive voltage and the output voltage $V_{out}$ is a steady-state voltage signal, which is provided to the second solenoid 202 (shown in FIG. 2B as $V_2$). As such, the electronic circuit 230 causes in some embodiments for there to be a time delay (corresponding to the time period $T_p$) of the steady-state input signal which is used to actuate the second solenoid 202. In some embodiments, the electronic circuit 230 is a time delay circuit configured to time delay a steady-state input signal and prevent passage of a PWM input signal.

Figure 2D:
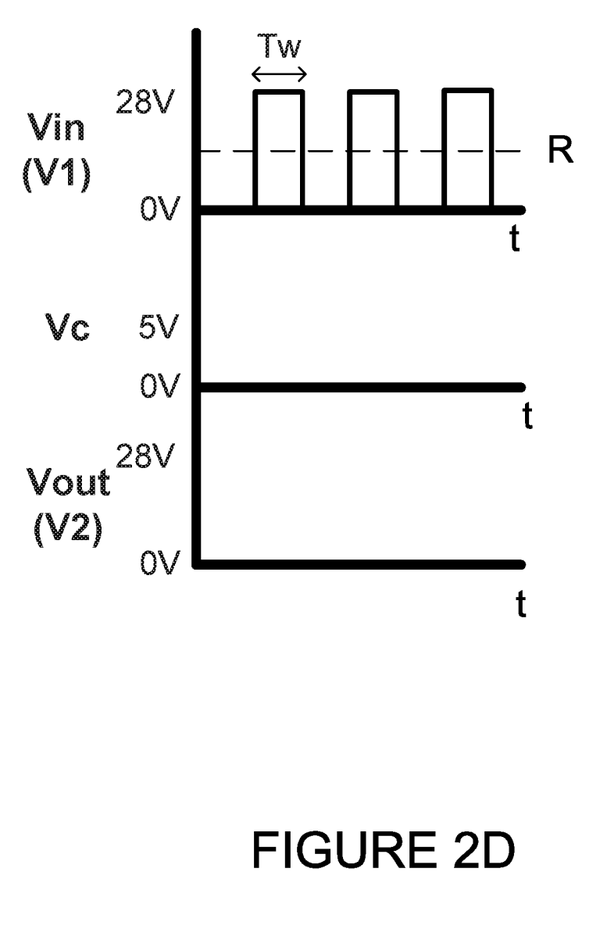
FIG. 2D is a signal diagram illustrating voltage signals in a second mode of operation, in accordance with some embodiments.

With additional reference to FIG. 2D, a signal diagram illustrates the input voltage signal $V_{in}$, the output voltage $V_{out}$, and the voltage control signal $V_c$ for when the pneumatic valve 210 is operated in the second mode of operation, in accordance with some embodiments. The input voltage signal $V_{in}$ is a PWM input signal, which is also provided to the first solenoid 201. However, as the pulse width time period $T_W$ is less than the set time period $T_p$, the control signal $V_c$ is a zero voltage signal and the output voltage $V_{out}$ is a zero voltage signal, which is provided to the second solenoid 202.

The electronic circuit 230 may vary depending on practical implementations and the electronic circuit 230 illustrated in FIG. 2B is a specific and non-limiting example of implementation of an electronic circuit configured to allow passage of a steady-state input signal and prevent passage of a PWM input signal.

Figure 3:
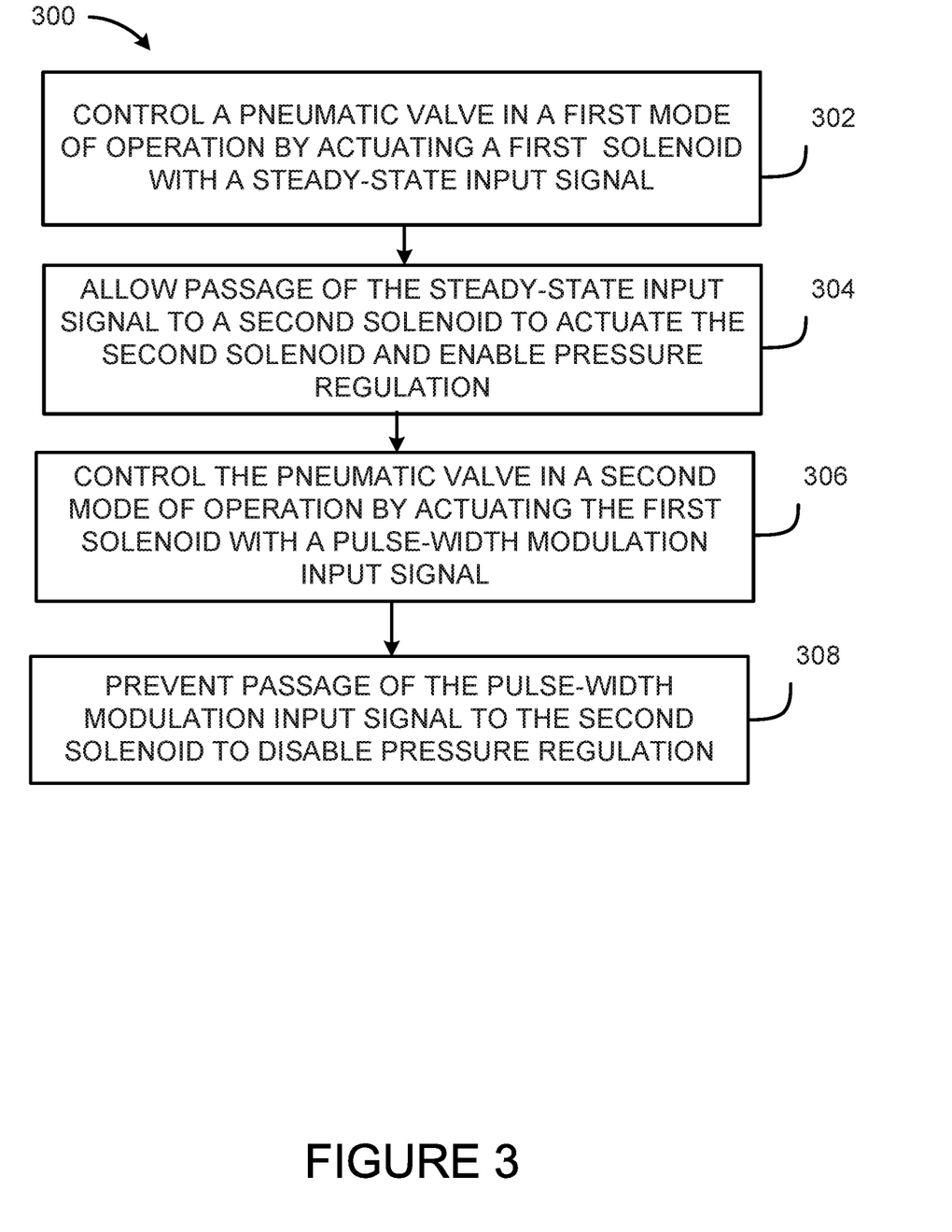
FIG. 3 is a flowchart of a method for controlling a pneumatic valve, in accordance with some embodiments.

With reference to FIG. 3, there is illustrated a flowchart of a method 300 for controlling a pneumatic valve, such as the pneumatic valve 210, in accordance with some embodiments. At step 302, the pneumatic valve 210 is controlled in a first mode of operation by actuating the first solenoid 201 with a steady-state input signal. At step 304, passage of the steady-state input signal to the second solenoid 202 is allowed, to actuate the second solenoid 202 and enable pressure regulation of the pneumatic valve 210. At step 306, the pneumatic valve 210 is controlled in a second mode of operation by actuating the first solenoid 201 with a PWM input signal. At step 308, passage of the PWM input signal to the second solenoid 202 is prevented, to disable the pressure regulation in the second mode of operation.

In some embodiments, step 304 comprises time delaying the steady-state input signal provided to the second solenoid 202 by a period of time $T_p$ larger than a pulse width time period $T_w$ of the PWM input signal.

In some embodiments, step 304 comprises comparing a voltage level of the steady-state input signal to a threshold R and allowing passage of the steady-state input signal to the second solenoid 202 when the threshold R has been exceed for the period of time $T_p$.

In some embodiments, step 308 comprises comparing a voltage level of the PWM input signal to the threshold R and preventing passage of the PWM input signal to the second solenoid 202 while the threshold R has been exceed for less than the period of time $T_P$ (i.e., when the threshold R has not been exceeded for the period of time $T_p$).

In some embodiments, controlling the pneumatic valve 210 in the first mode of operation comprises controlling the pneumatic valve 210 in the first mode of operation in response to a request for starting the engine 10 and controlling the pneumatic valve 210 in the second mode of operation comprises controlling the pneumatic valve 210 in the second mode of operation in response to a request for mitigating bowing of a rotor of the engine 10.

In some embodiments, the PWM input signal has a rate and a duty cycle to cause the pneumatic valve 210 to provide pressure lower than a regulating point of the pneumatic valve 210 used for starting the engine 10.

In some embodiments, a reference pressure of the pneumatic valve is vented to ambient pressure when pressure regulation is disabled.

While the methods and systems are described herein in the context of a pneumatic starter air valve used for air starting an engine, the methods and/or systems may be use control any other suitable valve and/or any suitable device for any suitable purpose, including, but not limited to, any other suitable pneumatic valve, any suitable solenoid driven device comprising two solenoids and/or any two suitable devices each comprising a solenoid.

Figure 4:
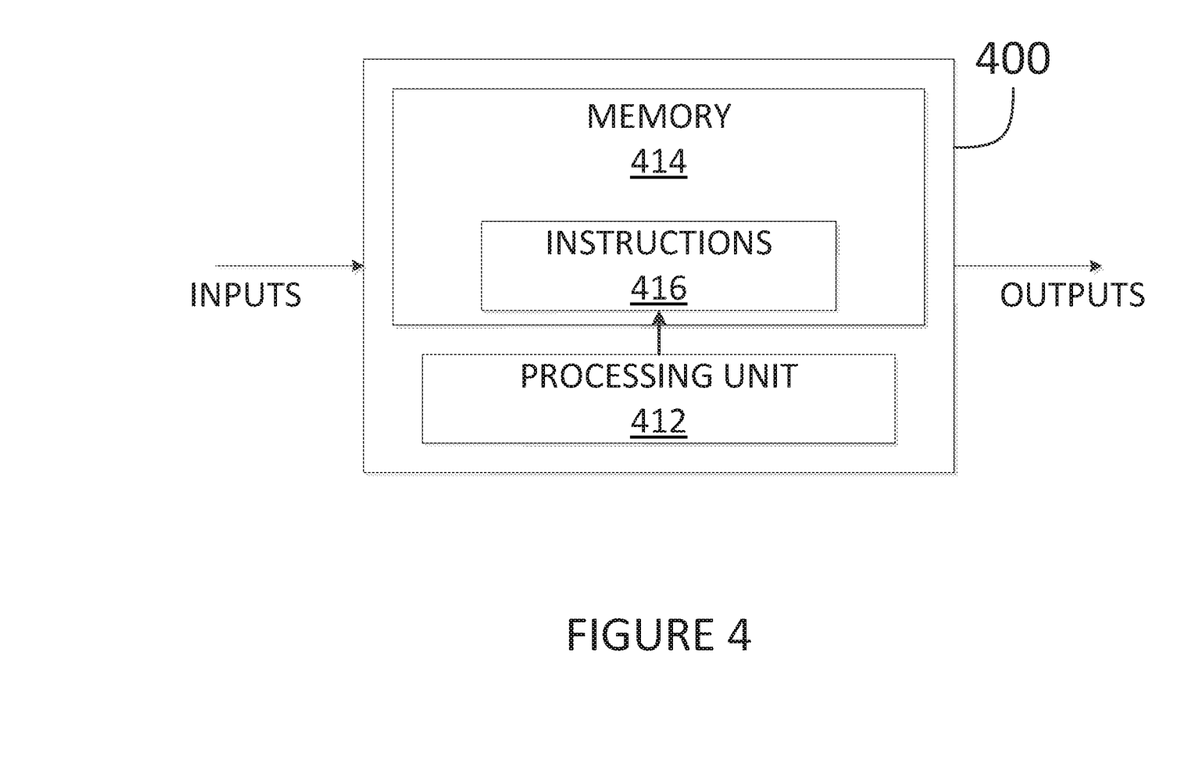
FIG. 4 is a block diagram of an example computing device, in accordance with some embodiments.

With reference to FIG. 4, an example of a computing device 400 is illustrated. The computing device 400 may be used to control the controllable power supply 230. The power supply monitor circuit 250 may be implemented using a computing device of the type of the computing device 400. The computing device 400 comprises a processing unit 412 and a memory 414 which has stored therein computer-executable instructions 416. The processing unit 412 may comprise any suitable devices configured to implement at least in part the method 300 such that instructions 416, when executed by the computing device 400 or other programmable apparatus, may cause at least in part the functions/acts/steps performed as part of the method 300 as described herein to be executed. The processing unit 412 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 414 may comprise any suitable known or other machine-readable storage medium. The memory 414 may comprise non-transitory computer readable storage medium, for example, but not limited to, an electronic, magnetic, optical, electromagnetic, infrared, or semiconductor system, apparatus, or device, or any suitable combination of the foregoing. The memory 414 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 414 may comprise any storage means (e.g., devices) suitable for retrievably storing machine-readable instructions 416 executable by processing unit 412. Note that the computing device 400 can be implemented as part of a full-authority digital engine control (FADEC) or other similar device, including electronic engine control (EEC), engine control unit (ECU), and the like.

Computer-executable instructions 416 may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the methods and systems for controlling a pneumatic valve may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A method for controlling a pneumatic starter air valve of a gas turbine engine, the method comprising:
controlling the starter air valve in a first mode of operation by actuating a first solenoid of the starter air valve with a steady-state input signal;
allowing passage of the steady-state input signal to a second solenoid of the starter air valve to actuate the second solenoid and enable pressure regulation of the starter air valve;
controlling the starter air valve in a second mode of operation by actuating the first solenoid with a pulse-width modulation input signal; and
preventing passage of the pulse-width modulation input signal to the second solenoid to disable the pressure regulation in the second mode of operation.

2. The method of claim 1 wherein the pulse-width modulation input signal has a rate and a duty cycle to cause the starter air valve to provide pressure lower than a regulating point of the starter air valve used for starting the engine.

3. The method of claim 1, wherein allowing passage of the steady-state input signal to the second solenoid comprises time delaying the steady-state input signal by a period of time larger than a pulse width time period of the pulse-width modulation input signal.

4. The method of claim 1, wherein allowing passage of the steady-state input signal to the second solenoid comprises:
comparing a voltage level of the steady-state input signal to a threshold; and
allowing passage of the steady-state input signal to the second solenoid when the threshold has been exceed for a period of time.

5. The method of claim 1, wherein preventing passage of the pulse-width modulation input signal to the second solenoid comprises:
comparing a voltage level of the pulse-width modulation input signal to a threshold; and
preventing passage of the pulse-width modulation input signal to the second solenoid while the threshold has been exceed for less than a period of time.

6. The method of claim 1, wherein a reference pressure of the starter air valve is vented to ambient pressure when pressure regulation is disabled.

7. The method of claim 1, wherein controlling the starter air valve in the first mode of operation comprises controlling the starter air valve in the first mode of operation in response to a request for starting the engine and wherein controlling the starter air valve in the second mode of operation comprises controlling the starter air valve in the second mode of operation in response to a request for mitigating bowing of a rotor of the engine.

8. A system for controlling a pneumatic starter air valve of a gas turbine engine, the system comprising:
a first solenoid configured to operate the starter air valve in a first mode when the first solenoid is actuated by a steady-state input signal and to operate the starter air valve in a second mode when the first solenoid is actuated by a pulse-width modulation input signal;
a second solenoid configured to enable pressure regulation by a pressure regulator of the starter air valve when the second solenoid is actuated by the steady-state voltage input signal; and
an electronic circuit between the first solenoid and the second solenoid, the electronic circuit configured to allow passage of the steady-state input signal to the second solenoid and to prevent passage of the pulse-width modulation input signal to the second solenoid, the pressure regulation being disabled when the second solenoid is prevented from being actuated.

9. The system of claim 8, wherein the pulse-width modulation input signal has a rate and a duty cycle to cause the starter air valve to provide pressure lower than a regulating point of the starter air valve used for starting the engine.

10. The system of claim 8, wherein the electronic circuit comprise:
a control component configured to allow or prevent passage of an input voltage signal of the electronic circuit to the second solenoid, the input voltage signal being the steady-state input signal or the pulse-width modulation input signal; and
a power supply monitor circuit configured to compare a voltage level of the input voltage signal to a threshold, the power supply monitor circuit configured to enable the control component to allow passage of the input voltage when the threshold is exceeded from a period of time, and the power supply monitor circuit configured to disable the control component to prevent passage of the input voltage signal when the threshold is not exceeded from the period of time.

11. The system of claim 10, wherein the control component is a relay.

12. The system of claim 10, wherein the control component is a transistor.

13. The system of claim 8, wherein the pressure regulator vents a reference pressure of the valve to ambient pressure when pressure regulation by the pressure regulator is disabled.

* * * * *